US009198059B2

(12) United States Patent
Miyata

(10) Patent No.: US 9,198,059 B2
(45) Date of Patent: Nov. 24, 2015

(54) WIRELESS COMMUNICATION SYSTEM AND COMMUNICATION CONTROL METHOD

(71) Applicant: KYOCERA Corporation, Kyoto-shi, Kyoto (JP)

(72) Inventor: Takeo Miyata, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 49 days.

(21) Appl. No.: 14/354,102

(22) PCT Filed: Oct. 24, 2012

(86) PCT No.: PCT/JP2012/077421
§ 371 (c)(1),
(2) Date: Apr. 24, 2014

(87) PCT Pub. No.: WO2013/061987
PCT Pub. Date: May 2, 2013

(65) Prior Publication Data
US 2014/0274197 A1 Sep. 18, 2014

(30) Foreign Application Priority Data

Oct. 27, 2011 (JP) .................................. 2011-235908

(51) Int. Cl.
*H04W 36/00* (2009.01)
*H04W 24/02* (2009.01)
(Continued)

(52) U.S. Cl.
CPC .............. *H04W 24/02* (2013.01); *H04B 7/024* (2013.01); *H04B 7/15507* (2013.01); *H04W 28/16* (2013.01); *H04W 92/20* (2013.01)

(58) Field of Classification Search
CPC . H04W 84/045; H04W 88/10; H04W 52/241; H04W 64/00; H04W 72/0433; H04W 36/0083; H04W 36/0094; H04W 40/12; H04W 40/22; H04W 84/20; H04W 92/045; H04W 92/12

USPC ........................................................ 455/7, 24
See application file for complete search history.

(56) References Cited

U.S. PATENT DOCUMENTS

2011/0113299 A1  5/2011  Power et al.
2012/0108285 A1  5/2012  Yamazaki
(Continued)

FOREIGN PATENT DOCUMENTS

JP   2011-101358 A   5/2011
WO  2010/150896 A1  12/2010
WO  2011/016560 A1   2/2011
WO  2011/083774 A1   7/2011

OTHER PUBLICATIONS

International Search Report dated Jan. 22, 2013, issued for International Application No. PCT/JP2012/077421.
(Continued)

*Primary Examiner* — Tu X Nguyen
(74) *Attorney, Agent, or Firm* — Procopio, Cory, Hargreaves & Savitch LLP

(57) ABSTRACT

The present invention relates to a wireless communication system and a communication control method. The wireless communication system includes: a wireless terminal; a plurality of base stations; and a host-side base station, wherein, in a case where CoMP transmission/reception is requested, the host-side base station decides base stations cooperating therewith for the CoMP transmission/reception, opens wireless lines for base stations under connection to the wireless terminal, and sends a same signal thereto, thereby performs the CoMP transmission/reception, and each of a plurality of the base stations functions as a relay device in a case of transferring the signal with the host-side base station through the wireless line.

7 Claims, 7 Drawing Sheets

(51) Int. Cl.
  *H04B 7/02*   (2006.01)
  *H04W 28/16*   (2009.01)
  *H04W 92/20*   (2009.01)
  *H04B 7/155*   (2006.01)

(56) References Cited

U.S. PATENT DOCUMENTS

2012/0135771 A1   5/2012   Futaki
2012/0282966 A1*  11/2012  Koo et al. .................... 455/517
2013/0279403 A1   10/2013  Takaoka et al.

OTHER PUBLICATIONS

Sharp, Information exchange over a wireless X2 interface between relay nodes, 3GPP TSG RAN WG2 Meeting #66, R2-092827, May 4-8, 2009, San Francisco, USA.
3GPP TR 36.814, V9.0.0, 3GPP, Mar. 2010 3rd Generation Partnership Project; Technical Specification Group Radio Access Network; Evolved Universal Terrestrial Radio Access (E-UTRA); Further advancements for E-UTRA physical layer aspects (Release 9).
International Preliminary Report on Patentability dated Apr. 29, 2014 issued for International application No. PCT/JP2012/077421.

* cited by examiner

F I G. 6
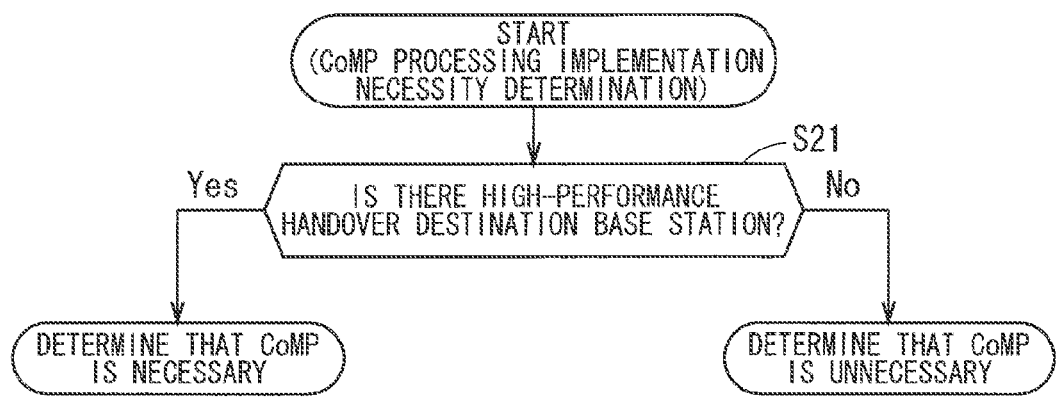
F I G. 7
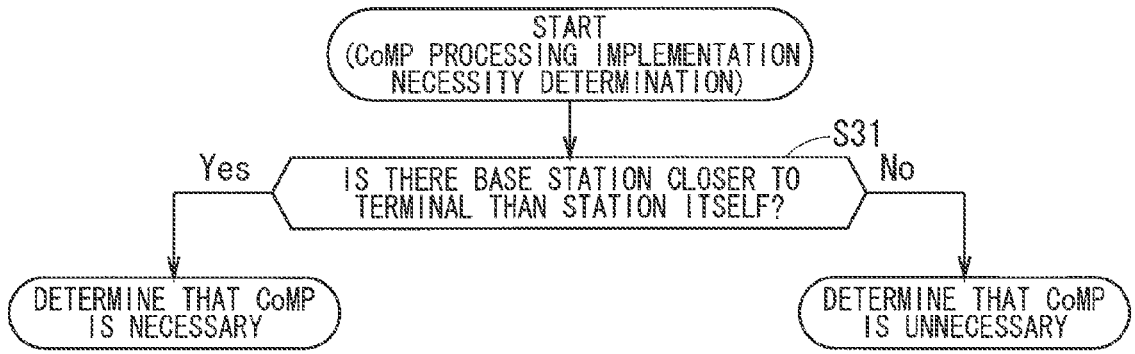

WIRELESS COMMUNICATION SYSTEM AND COMMUNICATION CONTROL METHOD

TECHNICAL FIELD

The present invention relates to a wireless communication system and a communication control method, and particularly, relates to a wireless communication system and a communication control method, which are suitable for Coordinated MultiPoint (CoMP) transmission/reception.

BACKGROUND ART

As a technique for enhancing performance of wireless communication at an area fringe of a base station, Coordinated MultiPoint (CoMP) transmission/reception is proposed and examined in the 3GPP (Third Generation Partnership Project) or the like.

A basic principle of the CoMP is in adjusting transmission or reception in cooperation among different cells. For example, there are considered: a method for performing joint processing for signal information, which is individually received by a plurality of cells, by putting the signal information on communication among the cells; joint transmission from the plurality of cells to a same user in a case of downlink transmission, and the like.

By performing the CoMP transmission/reception, such effects are obtained that interference from an adjacent cell is reduced, and that a desired signal level is increased. Therefore, improvement of frequency utilization efficiency at the area fringe of the base station can be expected.

As a communication system that executes the CoMP transmission/reception, a communication system disclosed in Patent Document 1 is mentioned.

PRIOR ART DOCUMENT

Patent Document

Patent Document 1: Japanese Patent Application Laid-Open No. 2011-101358

SUMMARY OF INVENTION

Problems to be Solved by the Invention

In order to realize the CoMP transmission/reception, it is necessary for respective base stations to share plural pieces of base station information and to communicate with a communication terminal. Then, in order to share the information between the base stations installed at different places, data transfer through a host device via a wired network becomes necessary.

That is to say, in a case where the respective base stations are connected to the wired network and information from a certain base station is attempted to be shared by other base stations, the information from the certain base station is given once to a host device via the wired network, and is then given to the other base station from the host device, passing through the wired network one more time. Therefore, there has been a problem that it takes a time to share the information to thereby cause a delay.

Moreover, there is a problem of a trade-off relationship between rapidity and communication quality. That is to say, if the rapidity is required, then it is necessary to suppress an overhead amount; however, the overhead amount will be increased in order to enhance the communication quality. Then, there are a variety of modes in the CoMP transmission/reception, and there has been a problem that it is difficult to determine a data format, in which the trade-off relationship between the rapidity and the communication quality is taken into consideration, in accordance with each of the modes.

The present invention has been made in order to solve the problem as described above, and it is an object of the present invention to provide a wireless communication system and a communication control method, each of which is capable of reducing the time spent for sharing the information between the base stations, and in addition, is capable of realizing the CoMP transmission/reception while improving the trade-off relationship between the rapidity and the communication quality.

Means for Solving the Problems

In order to solve the foregoing problem, a wireless communication system according to the present invention includes: a wireless terminal; a plurality of communication devices which perform wireless communication with the wireless terminal; and a host-side communication device capable of performing wireless communication with the plurality of communication devices, characterized in that each of the plurality of communication devices includes a control unit that, in a case where the communication device is under connection to the wireless terminal, acquires received information of an uplink signal from the wireless terminal and feedback information from the wireless terminal, and performs a determination as to whether or not coordinated multipoint transmission/reception processing by the wireless communication with the host-side communication device is necessary based on either of the acquired received information of the uplink signal and the feedback information, in a case of having determined that the coordinated multipoint transmission/reception processing is necessary, the control unit requests the coordinated multipoint transmission/reception processing to the host-side communication device, and in addition, transmits information to the host-side communication device, the information being necessary to decide other communication device cooperating with each of the plurality of communication devices for the coordinated multipoint transmission/reception processing, the host-side communication device includes a control unit that, in a case where the coordinated multipoint transmission/reception processing is requested, decides, based on the information, the other communication device cooperating with each of the plurality of communication devices for the coordinated multipoint transmission/reception processing, opens wireless lines for the communication device under connection to the wireless terminal and for the other communication device, and sends a same signal to the other communication device and the communication device under connection to the wireless terminal, thereby performs the coordinated multipoint transmission/reception processing, and the control unit of each of the plurality of communication devices controls a station including the control unit to function as a relay device in a case of transferring a signal with the host-side communication device through the wireless line.

In an aspect of the wireless communication system according to the present invention, the received information of the uplink signal includes a received signal strength indication of the uplink signal and a carrier to interference-plus-noise ratio of the uplink signal, and the control unit of each of the communication devices determines that the coordinated multipoint transmission/reception processing is necessary in a case where a value of at least either one of the received signal strength indication of the uplink signal and the carrier to interference-plus-noise ratio of the uplink signal is smaller than a predetermined threshold value.

In an aspect of the wireless communication system according to the present invention, the feedback information includes handover candidate information serving as a candidate for handover, the candidate being decided by the wireless terminal based on a value of either one of a received signal strength indication of a downlink signal from each of the plurality of communication devices, the downlink signal having received by the wireless terminal, and of a carrier to interference-plus-noise ratio of the downlink signal, and the control unit of each of the plurality of communication devices determines that the coordinated multipoint transmission/reception processing is necessary in a case where, with regard to the communication device which the wireless terminal defines as the candidate for the handover, a value of the received signal strength indication of the downlink signal or the carrier to interference-plus-noise ratio of the downlink signal is larger than a value of the received signal strength indication of the downlink signal between the communication device itself and the wireless terminal or of the carrier to interference-plus-noise ratio of the downlink signal.

In an aspect of the wireless communication system according to the present invention, the feedback information includes handover candidate information serving as a candidate for handover, the candidate being decided by the wireless terminal based on a value of either one of a received signal strength indication of a downlink signal from each of the plurality of communication devices, the downlink signal having received by the wireless terminal, and of a carrier to interference-plus-noise ratio of the downlink signal, and the control unit of each of the plurality of communication devices determines that the coordinated multipoint transmission/reception processing is necessary in a case where, with regard to the communication device which the wireless terminal defines as the candidate for the handover, a value of the received signal strength indication of the downlink signal or the carrier to interference-plus-noise ratio of the downlink signal is larger than a predetermined value.

In an aspect of the wireless communication system according to the present invention, the feedback information includes position information of the wireless terminal, and the control unit of each of the plurality of communication devices searches a position of a communication device on a periphery of the wireless terminal based on position information of the wireless terminal, and in a case where a communication device closer to the wireless terminal than a station including the control unit, determines that the coordinated multipoint transmission/reception processing is necessary.

A wireless communication system according to the present invention includes: a wireless terminal; and a plurality of communication devices which perform wireless communication with the wireless terminal, characterized in that each of the plurality of communication devices includes a control unit that, in a case where the communication device is under connection to the wireless terminal, acquires received information of an uplink signal from the wireless terminal and feedback information from the wireless terminal, and performs a determination as to whether or not coordinated multipoint transmission/reception processing by wireless communication with other communication device is necessary based on either of the acquired received information of the uplink signal and the feedback information, in a case of having determined that the coordinated multipoint transmission/reception processing is necessary, the control unit decides the other communication device cooperating with each of the plurality of communication devices for the coordinated multipoint transmission/reception processing, and in a case where a station including the control unit is the communication device under connection to the wireless terminal, opens a wireless line for the other communication device, sends a same signal to the other communication device, thereby performs the coordinated multipoint transmission/reception processing, and in a case where the station including the control unit is the other communication device, the control unit of each of the plurality of communication devices controls the station to function as a relay device in a case of transferring a signal through the wireless line with the communication device under connection to the wireless terminal.

A communication control method according to the present invention is a communication control method of wireless communication system including a wireless terminal, a plurality of communication devices which perform wireless communication with the wireless terminal, and a host-side communication device capable of performing wireless communication with the plurality of communication devices, the communication control method including the steps of: (a) in the communication device under connection to the wireless terminal, acquiring received information of an uplink signal from the wireless terminal and feedback information from the wireless terminal; (b) performing a determination as to whether or not coordinated multipoint transmission/reception processing by the wireless communication with the host-side communication device is necessary based on either of the received information of the uplink signal and the feedback information, the received information and the feedback information being acquired in the step (a); (c) in a case of having determined that the coordinated multipoint transmission/reception processing is necessary in the step (b), requesting the coordinated multipoint transmission/reception processing to the host-side communication device, and in addition, transmitting information to the host-side communication device, the information being necessary to decide other communication device cooperating with each of the plurality of communication devices for the coordinated multipoint transmission/reception processing; (d) in a case where the coordinated multipoint transmission/reception processing is requested in the host-side communication device, deciding, based on the information, the other communication device cooperating with each of the plurality of communication devices for the coordinated multipoint transmission/reception processing, opening wireless lines for the communication device under connection to the wireless terminal and for the other communication device, and sending a same signal to the other communication device and the communication device under connection to the wireless terminal, thereby performing the coordinated multipoint transmission/reception processing; and (e) in each of the plurality of communication device, controlling a station including the control unit to function as a relay device in a case of transferring a signal with the host-side communication device through the wireless line.

Effects of the Invention

In accordance with the wireless communication system according to the present invention, a time spent for sharing the information between the communication devices can be reduced, and in addition, the CoMP transmission/reception can be realized while improving the trade-off relationship between the rapidity and the communication quality.

In accordance with the communication control method according to the present invention, the time spent for sharing the information between the communication devices can be reduced, and in addition, the CoMP transmission/reception can be realized while improving the trade-off relationship between the rapidity and the communication quality.

BRIEF DESCRIPTION OF DRAWINGS

FIG. 6 is a flowchart of determining whether or not the CoMP processing is necessary based on whether or not a handover destination is present.

FIG. 7 is a flowchart of determining whether or not the CoMP processing is necessary based on a position of a peripheral base station.

DESCRIPTION OF EMBODIMENT

<Embodiment 1>

Figure 1:
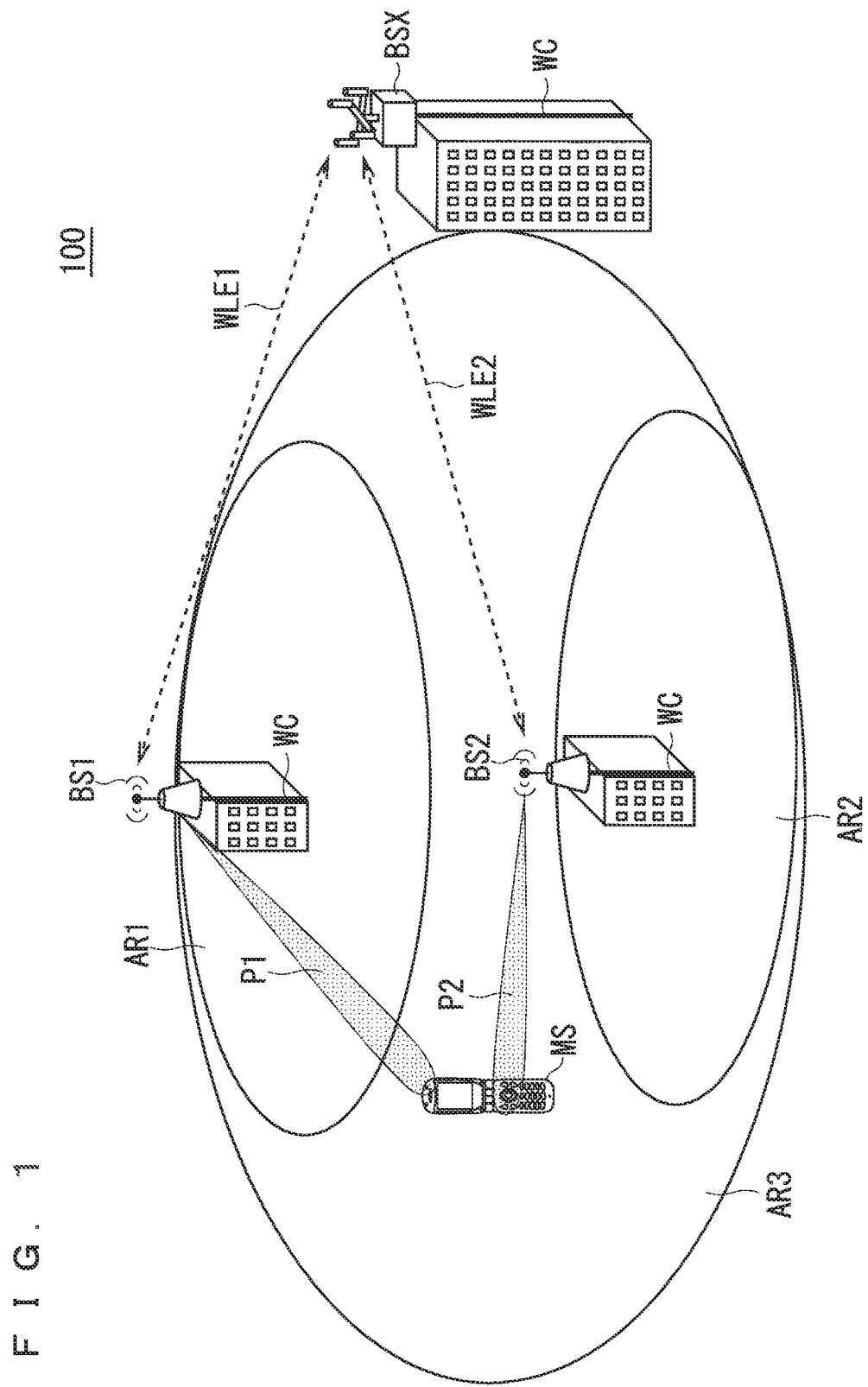
FIG. 1 is a view showing a configuration of a communication system of an embodiment according to the present invention.

FIG. 1 is a view showing a configuration of a communication system of an embodiment according to the present invention. A wireless communication system 100 shown in FIG. 1 includes: a wireless terminal MS; base stations BS1 and BS2; and a host-side base station BSX. The base stations BS1 and BS2 and the host-side base station BSX are connected to each other through a wired line WC such as an optical line and an ISDN line, and moreover, a host device (not shown) is also connected to the wired line WC.

<Configuration of Base Station>

Figure 2:
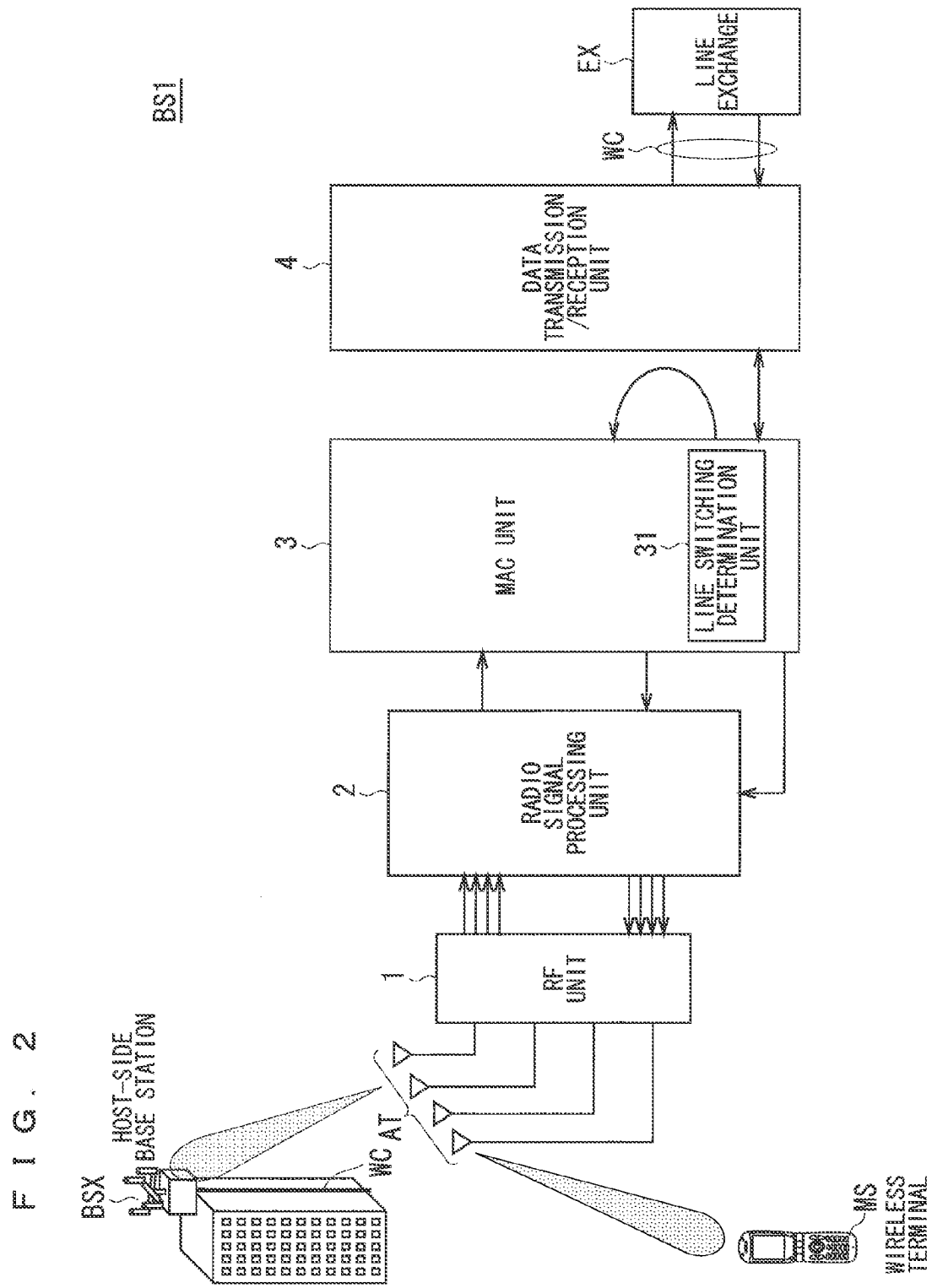
FIG. 2 is a block diagram showing a configuration of a base station of the embodiment according to the present invention.

FIG. 2 is a block diagram showing a configuration of the base station BS1 (BS2 is also the same), and in FIG. 2, only the configuration according to the present invention is shown, and other configurations are omitted.

As shown in FIG. 2, the base station BS1 includes: an RF unit (wireless communication unit) 1 to which a transmitting/receiving antenna AT is connected; a radio signal processing unit 2 composed of a CPU (Central Processing Unit) or the like, which is connected to the RF unit 1; a MAC unit (Media Access Control) 3 connected to the radio signal processing unit 2; and a data transmission/reception unit 4 connected to the MAC unit 3.

The MAC unit 3 is a region, which is composed of a CPU or the like, and performs communication control according to protocol of a communication mode to be used by the wireless communication system 100, and the MAC unit 3 includes a line switching determination unit 31.

In a case where the wired line WC is the optical line, an ONU (Optical Network Unit) applies to the data transmission/reception unit 4, and the data transmission/reception unit 4 is connected through the wired line WC to a line exchange EX that performs a line exchange with the host device (not shown).

In the base station BS1, a received signal received by the transmitting/receiving antenna AT is inputted to a receiving unit (not shown) of the RF unit 1, is subjected to amplification processing and down converting, is converted into a base band signal, and is outputted. Note that the signal received by the transmitting/receiving antenna AT is modulated by a BPSK (Binary Phase Shift Keying) modulation mode, a QPSK (Quadrature Phase Shift Keying) modulation mode, or the like.

Moreover, in accordance with an instruction from the radio signal processing unit 2, the RF unit 1 sends out such a radio signal modulated by the BPSK modulation mode, the QPSK modulation mode or the like.

The radio signal processing unit 2 receives the radio signal outputted from the RF unit 1, analyzes a message and data, and notifies an analysis result thereof to the MAC unit 3. Note that the message includes a connection request and disconnection request of the communication from the wireless terminal MS. Moreover, a response result to the connection request and disconnection request of the communication, the response result having been received from the host device (not shown), or the like is given to the radio signal processing unit 2, is converted into the message and the data, and is notified to the wireless terminal MS through the RF unit 1.

The data transmission/reception unit 4 outputs the signal, which is received by the transmitting/receiving antenna AT, to the wired line WC in accordance with communication control from the MAC unit 3. Note that the signal is given to the host device (not shown) through the line exchange EX.

The line switching determination unit 31 included in the MAC unit 3 determines whether the base station BS1 functions as a usual base station or as a relay device. In a case where the base station BS1 functions as the relay device, the line switching determination unit 31 has a function to switch lines so as not to give the signal, which is received by the transmitting/receiving antenna AT, to the data transmission/reception unit 4, but to return the signal to the MAC unit 3 in order to transmit the signal one more time by the transmitting/receiving antenna AT.

Figure 3:
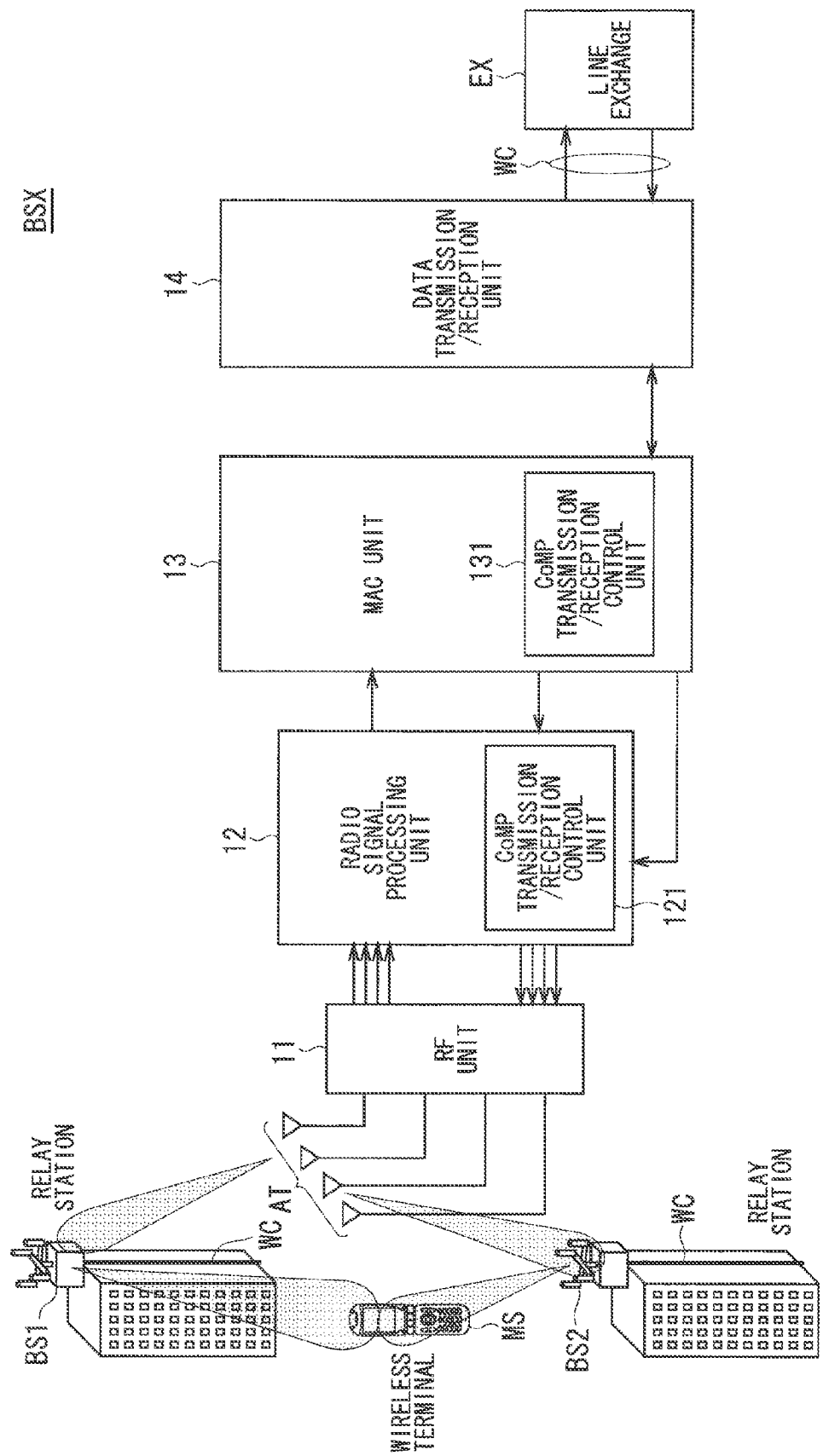
FIG. 3 is a block diagram showing a configuration of a host-side base station of the embodiment according to the present invention.

FIG. 3 is a block diagram showing a configuration of the host-side base station BSX, and in FIG. 3, only the configuration according to the present invention is shown, and other configurations are omitted.

As shown in FIG. 3, the base station BSX includes: an RF unit (wireless communication unit) 11 to which the transmitting/receiving antenna AT is connected; a radio signal processing unit 12 composed of a CPU (Central Processing Unit) or the like, which is connected to the RF unit 11; a MAC unit (Media Access Control) 13 connected to the radio signal processing unit 12; and a data transmission/reception unit 14 connected to the MAC unit 13.

The MAC unit 13 is a region, which is composed of a CPU or the like, and performs communication control according to protocol of a communication mode to be used by the wireless communication system 100, and the MAC unit 13 includes a CoMP transmission/reception control unit 131.

In the case where the wired line WC is the optical line, the ONU (Optical Network Unit) applies to the data transmission/reception unit 14, and the data transmission/reception unit 14 is connected through the wired line WC to the line exchange EX that performs the line exchange with the host device (not shown).

In the base station BSX, a received signal received by the transmitting/receiving antenna AT is inputted to a receiving unit (not shown) of the RF unit 11, is subjected to amplification processing and down converting, is converted into a base band signal, and is outputted. Note that the signal received by the transmitting/receiving antenna AT is modulated by the BPSK (Binary Phase Shift Keying) modulation mode, the QPSK (Quadrature Phase Shift Keying) modulation mode, or the like.

Moreover, in accordance with an instruction from the radio signal processing unit 12, the RF unit 11 sends out such a radio signal modulated by the BPSK modulation mode, the QPSK modulation mode or the like.

The radio signal processing unit 12 receives the radio signal outputted from the RF unit 1, analyzes a message and data, and notifies an analysis result thereof to the MAC unit 13. Note that the message includes a connection request and disconnection request of the communication from the wireless terminal MS. Moreover, a response result to the connection request and disconnection request of the communication, the response result having been received from the host device (not shown), or the like is given to the radio signal processing unit 12, is converted into the message and the data, and is notified to the wireless terminal MS through the RF unit 11. Note that the radio signal processing unit 12 includes a CoMP transmission/reception control unit 121.

The data transmission/reception unit 14 outputs the signal, which is received by the transmitting/receiving antenna AT, to the wired line WC in accordance with communication control from the MAC unit 13. Note that the signal is given to the host device (not shown) through the line exchange EX.

The CoMP transmission/reception control unit 131 included in the MAC unit 13 has a function to control the MAC unit 13 in a case of performing CoMP transmission/reception, and controls the CoMP transmission/reception in cooperation with the CoMP transmission/reception control unit 121 included in the radio signal processing unit 12.

Here, in the wireless communication system 100 shown in FIG. 1, in a case where implementation of the CoMP is requested from the base station BS1, a wireless line (wireless entrance line) WLE1 is used as an entrance line that is a transmission path connecting the base station BS1 and the host-side base station BSX to each other, and a wireless line (wireless entrance line) WLE2 is used as an entrance line that is a transmission path connecting the base station BS2, which is adjacent to the base station BS1, and the host-side base station BSX to each other. Then, the base station BS1 that has requested the implementation of the CoMP operates as the relay device that connects to the host-side base station BSX. Meanwhile, the host-side base station BSX requested to implement the CoMP searches the other base station BS2 communicable with the wireless terminal MS that is communicating with the base station that has requested the implementation of the CoMP, and also operates the base station BS2 as the relay device.

In this way, a plurality of the relay devices are set, and wireless communication is performed with one wireless terminal by using these, whereby it becomes possible to perform the CoMP transmission/reception.

In FIG. 1, as an effect by the CoMP transmission/reception, an effect of making it possible to expand a communicable area of the base station is schematically shown. That is to say, in FIG. 1, in a case where a communicable area of the base station BS1 is AR1, and where a communicable area of the base station BS2 is AR2, if the wireless terminal MS is located at area fringes of the communicable areas AR1 and AR2, then it is anticipated that communication quality may be deteriorated. However, the base station BS1 performs the CoMP transmission/reception for the wireless terminal MS through a wireless path P1, and the base station BS2 performs the CoMP transmission/reception for the wireless terminal MS through a wireless path P2, whereby the base stations BS1 and BS2 can mutually interpolate the communication quality, can suppress the deterioration of the communication quality, and can substantially expand a communicable area by the base stations BS1 and BS2. In FIG. 1, the communicable area by the base stations BS1 and BS2 is shown as AR3.

In this CoMP transmission/reception, similar processing to slot diversity processing for use in a base station of PHS (Personal Handyphone System) is employed, and it is not necessary to set complicated protocol.

That is to say, the slot diversity processing in the base station of the PHS is processing for enhancing link performance by performing communication with one wireless terminal by using a plurality of time slots or a plurality of frequency slots. Then, in a case of applying the slot diversity processing to the CoMP transmission/reception, only a configuration, in which the same data is sent from a plurality of relay devices in place of such a plurality of slots, just needs to be adopted. Therefore, unlike the conventional CoMP transmission/reception, it is not necessary to perform the data transfer through the host device via the wired network in order to share the information between the base stations installed at such different places, and it becomes unnecessary to set the complicated protocol.

Moreover, it becomes unnecessary to perform the data transfer through the host device via the wired network in order to share the information between the base stations, and accordingly, such an occurrence of the delay caused by sharing the information can be suppressed. Therefore, a trade-off relationship between rapidity and the communication quality can be improved, and the CoMP transmission/reception can be realized.

<Flow Until Execution of CoMP Transmission/Reception>

While referring to FIG. 1 to FIG. 3, a description is made below of a flow until execution of the CoMP transmission/reception in the wireless communication system 100 according to the present invention by using flowcharts shown in FIG. 4 to FIG. 7.

In the following description, it is premised that the wireless terminal MS and the base station BS1 are in a state under communication connection in the wireless communication system 100 shown in FIG. 1.

Figure 4:
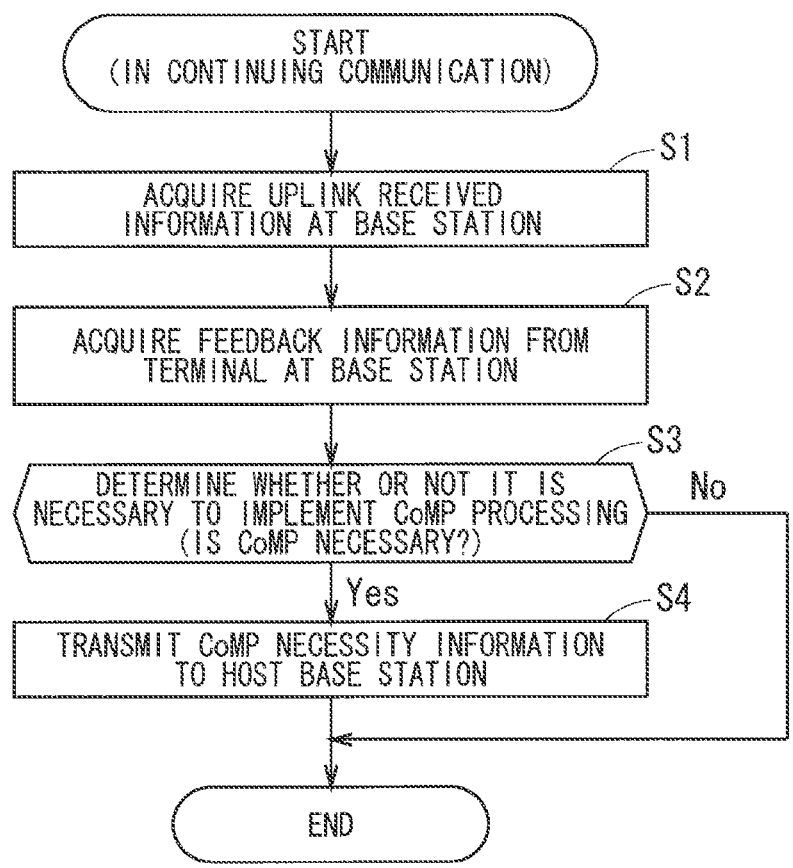
FIG. 4 is a flowchart explaining a communication control method of the communication system of the embodiment according to the present invention.

FIG. 4 is a flowchart explaining a communication control method of the wireless communication system 100 according to the present invention.

In FIG. 4, the base station BS1 in the state under the communication connection with the wireless terminal MS acquires reception information of an uplink signal from the wireless terminal MS (Step S1). This reception information is captured into the MAC unit 3 through the radio signal processing unit 2, and includes signal quality information such as an RSSI (Received Signal Strength Indication) of the uplink signal and a CINR (Carrier to Interference-plus-Noise Ratio) of the uplink signal.

Moreover, the base station BS1 acquires feedback information from the wireless terminal MS (Step S2). This feedback information includes the signal quality information (RSSI, CINR) of the downlink signals from the base station BS1 and a peripheral base station, which have been received by the wireless terminal MS, an error rate in the wireless terminal MS, handover candidate information, and GPS (Global Positioning System) information of the wireless terminal MS.

Here, the handover candidate information is information about a base station serving as a candidate for handover of the wireless terminal MS under connection, and includes: an ID of the peripheral base station defined as the candidate for the handover based on a value obtained in such a manner that the wireless terminal MS measures the CINR of the downlink signal from the peripheral base station; the value of the CINR thus measured; and the like.

Moreover, the GPS information is information, which indicates a position (latitude, longitude) of the wireless terminal MS, in a case where the wireless terminal MS has a GPS function.

The base station BS1, which has acquired the information described above, performs a determination as to whether or not it is necessary to implement the CoMP processing (CoMP transmission/reception processing), that is, a determination as to whether or not the CoMP processing is necessary based on the acquired information, for example, in the MAC unit 3 (Step S3).

This determination can be performed, for example, based on whether or not the wireless terminal MS under connection approaches the area fringe to allow signal power thereof to be weakened, and can be performed based on the signal quality information (RSSI, CINR) of the uplink signal acquired in Step S1 and on the signal quality information (RSSI, CINR) of the downlink signals acquired in Step S2.

In a case where it is determined that the CoMP processing is necessary in Step S3, the CoMP processing is requested to the host-side base station BSX, and in addition, such information necessary for the CoMP processing, for example, the information (ID, CINR) about the peripheral base station serving as the candidate for the handover, such position information of the wireless terminal MS, and the like are transmitted thereto through the wired line WC (Step S4), and a series of the processing is ended.

Here, the host-side base station BSX just needs to be a base station, which is wirelessly communicable with a plurality of the base stations including the base station BS1, and has a control function for the CoMP transmission/reception, and it is not necessary that the host-side base station BSX be a base station dedicated for the CoMP transmission/reception. Hence, the base station BS1 under connection to the wireless terminal MS decides the host-side base station BSX from among the other base stations based on information (previously provided as base station information) about a base station, which is wirelessly communicable with the base station BS1 itself and is also communicable with other base stations, and then the base station BS1 performs the above-described processing of Step S4.

Note that, in an event of the decision of the host-side base station BSX, the host-side base station BSX may be decided, for example, by being selected from among the base stations wirelessly communicable with the peripheral base station serving as the candidate for the handover of the wireless terminal MS, and the like based on the feedback information from the wireless terminal MS, which is acquired in Step S2, and the like, or may be decided by being selected from among the base stations, which are located in a predetermined distance from the wireless terminal MS, based on the GPS information from the wireless terminal MS included in the feedback information from the wireless terminal MS in the same way.

Moreover, in terms of the system, such a configuration may be adopted, in which the base station serving as a host and the base station serving as a subordinate are previously decided for each of the base stations, and in a case where the base station serving as the subordinate enters a situation where the base station itself determines whether or not it is necessary to implement the CoMP processing, the base station performs the above-described processing of Step S4.

Note that, also in a case where the CoMP processing is unnecessary in Step S3, a series of the processing is ended; however, in a case where the base station is under connection to any of the wireless terminals, the processing of Steps S1 to S3 is repeatedly executed.

The host-side base station BSX, which has received the request for the CoMP processing and the information necessary for the CoMP processing, decides the base station BS2, which is communicable with the wireless terminal MS and has best communication quality, as a cooperative base station based on the information, for example, in the MAC unit 13, and opens the wireless lines (wireless entrance lines) between the host-side base station BSX and the base station BS1 and between the host-side base station BSX and the base station BS2. Then, the base stations BS1 and BS2 are used as the relay devices which transfer the signals with the wireless terminal MS through the wireless entrance lines, and the CoMP transmission/reception is implemented.

In this case, the CoMP transmission/reception control unit 131 of the MAC unit 13 (FIG. 3) of the host-side base station BSX controls the CoMP transmission/reception in cooperation with the CoMP transmission/reception control unit 121 of the radio signal processing unit 12, the CoMP transmission/reception control unit 121 controls the radio signal processing unit 12 to open the wireless entrance lines for the base stations BS1 and BS2, and the radio signal processing unit 12 controls directivity of the transmitting/receiving antenna AT, and opens the wireless entrance lines for the base stations BS1 and BS2.

Here, as the transmitting/receiving antenna AT, for example, an array antenna composed of a plurality of antenna elements is used, and a beam direction of the antenna is adjusted, whereby the transmission/reception of the signal can be selectively performed with a desired base station.

A signal serving as a target of the CoMP transmission/reception is transferred with the line exchange EX through the wired line WC, and the line exchange EX transfers the signal with the host device (not shown) through the network.

Moreover, with regard to the base stations BS1 and BS2, which function as the relay devices in the CoMP transmission/reception, when the wireless entrance lines are opened with the host-side base station BSX, and such radio signals are received thereby from the host-side base station BSX, the line switching determination unit 31 of the MAC unit 3 of each of the base stations BS1 and BS2 determines that the base station thereof functions as the relay device, and switches the line so as to return the signal, which is received by the transmitting/receiving antenna AT, to the MAC unit 3 in order that the signal can be transmitted from the transmitting/receiving antenna AT toward the wireless terminal MS.

By this operation, the base stations BS1 and BS2 come to function as the relay devices relaying, to the wireless terminal MS, the radio signals received from the host-side base station BSX, and moreover, come to function as the relay devices relaying the radio signals, which are received from the wireless terminal MS, to the hot-side base station BSX.

Note that, in the CoMP transmission/reception, the base stations which cooperate with each other individually receive the signals transmitted from the wireless terminal MS, and transmit the signals to the host-side base station BSX through the wireless entrance line. In this case, the base stations BS1 and BS2 relaying the signals are also capable of taking such measures as transmitting IQ information to the host-side base station BSX and synthesizing the IQ information with each other, and accordingly, even if quality of the signals received by the base stations BS1 and BS2 is low, the quality will be improved in the host-side base station BSX.

Figure 5:
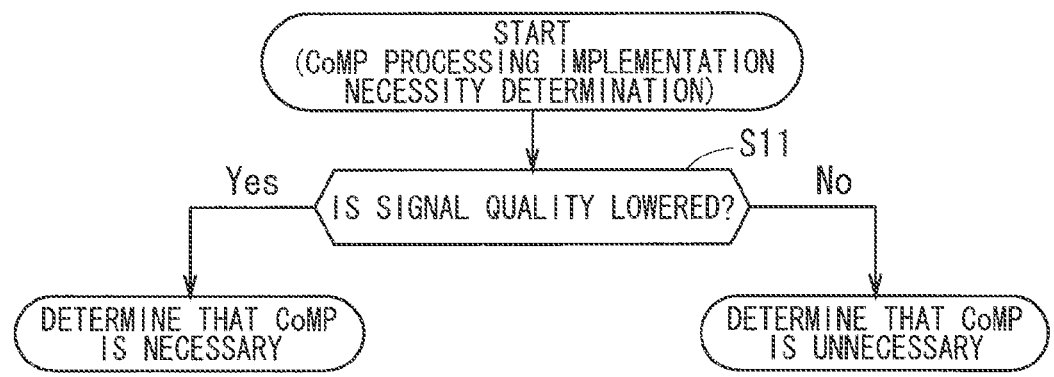
FIG. 5 is a flowchart of determining whether or not CoMP processing is necessary based on signal quality.

Next, by using the flowcharts shown in FIG. 5 to FIG. 7, a description is made of variations of the CoMP processing implementation necessity determination processing of Step S3 (FIG. 4).

FIG. 5 shows an example of determining whether or not the CoMP processing is necessary based on the signal quality, and the base station BS1 determines whether or not the CoMP processing is necessary, for example, based on whether or not the CINR (which may be the RSSI) of the uplink signal acquired in Step S1 (FIG. 4) is smaller than a predetermined threshold value X (Step S11).

In a case where the CINR of the uplink signal is smaller than the threshold value X, then it is considered that the wireless terminal MS under connection approaches the area fringe to allow the signal power to be weakened, and in that case, the signal quality is defined to be lowered, and it is determined that the CoMP processing is necessary.

Meanwhile, in a case where the CINR of the uplink signal is equal to or more than the threshold value X, the signal quality is defined not to be lowered, and it is determined that the CoMP processing is unnecessary.

FIG. 6 shows an example of determining whether or not the CoMP processing is necessary based on whether or not a handover destination is present, and with regard to the handover candidate information included in the feedback information from the wireless terminal MS acquired in Step S2 (FIG. 4), that is, the peripheral base station taken as the candidate for the handover in such a manner that the wireless terminal MS measures the CINR (which may be the RSSI) of the downlink signal from the peripheral base station, the base station BS1 determines whether or not the CoMP processing is necessary based on whether or not a value of that CINR is larger than the value of the CINR of the downlink signal between the base station BS1 itself and the wireless terminal MS (Step S21).

In a case where the value of the CINR (RSSI) of the downlink signal between the candidate for the handover and the wireless terminal MS is larger than the value of the CINR (RSSI) of the downlink signal between the base station BS1 itself and the wireless terminal MS, the base station BS1 determines that a base station (higher-performance base station), which has better signal quality than the base station BS1 itself, is present, and in that case, it is determined that the CoMP processing is necessary as a result that it is determined that better communication is enabled by performing the CoMP processing by using the base station taken as the candidate for the handover.

Meanwhile, in a case where the value of the CINR (RSSI) of the downlink signal between the candidate for the handover and the wireless terminal MS is equal to or less than the value of the CINR (RSSI) of the downlink signal between the base station BS1 itself and the wireless terminal MS, the base station BS1 determines that the base station, which has better signal quality than the base station BS1 itself, is not present, and it is determined that the CoMP processing is unnecessary.

Moreover, with regard to Step S21 of FIG. 6, in place of such comparison as mentioned above, which is made between the value of the CINR (RSSI) of the downlink signal between the candidate for the handover and the wireless terminal MS and the value of the CINR (RSSI) of the downlink signal between the base station BS1 itself and the wireless terminal MS, the base station BS1 is also capable of determining whether or not the CoMP processing is necessary based on whether or not the value of the CINR (RSSI) of the downlink signal between the candidate for the handover and the wireless terminal MS is larger than a predetermined threshold value Y.

In this case, in a case where the value of the CINR (RSSI) of the downlink signal between the candidate for the handover and the wireless terminal MS is larger than the threshold value Y, the base station BS1 determines that a base station (high-performance base station), which has good signal quality, is present, and in that case, it is determined that the CoMP processing is necessary as a result that it is determined that better communication is enabled by performing the CoMP processing by using the base station taken as the candidate for the handover.

Meanwhile, in a case where the value of the CINR (RSSI) of the downlink signal between the candidate for the handover and the wireless terminal MS is equal to or less than the threshold value Y, the base station BS1 determines that the base station, which has good signal quality, is not present, and it is determines that the CoMP processing is unnecessary.

FIG. 7 shows an example of determining whether or not the CoMP processing is necessary based on a position of the peripheral base station. Based on the GPS information of the wireless terminal MS included in the feedback information from the wireless terminal MS, which is acquired in Step S2 (FIG. 4), the position of the peripheral base station of the wireless terminal MS is searched, and it is determined whether or not there is present a base station closer to the wireless terminal MS than the base station BS1 itself (Step S31).

The respective base stations are fixed, and accordingly, positions thereof are definite. Therefore, among the respective base stations, it is possible to share information about mutual positions thereof, and for example, if the base station BS1 finds the position of the wireless terminal MS under connection based on the GPS information, the base station BS1 can determine where the base station on a periphery thereof is present.

Hence, it is easy to determine whether or not the base station closer to the wireless terminal MS than the base station BS 1 itself is present.

Then, in a case where the base station closer to the wireless terminal MS than the base station BS1 itself is present, the base station BS1 determines that a base station, which has better signal quality than the base station BS1 itself, is present, and in that case, it is determined that the CoMP processing is necessary as a result that it is determined that better communication is enabled by performing the CoMP processing by using the base station thus present.

Meanwhile, in a case where the base station closer to the wireless terminal MS than the base station BS1 itself is not present, the base station BS1 determines that the base station, which has better signal quality than the base station BS1 itself, is not present, and it is determined that the CoMP processing is unnecessary.

Note that, in the host-side base station BSX, which has received the request for the CoMP processing, a base station other than the base station BS1 may be decided as such a relay device for the CoMP transmission/reception together with the base station BS1, for example, based on the handover candidate information included in the feedback information from the wireless terminal MS, which is transmitted in Step S4 (FIG. 4), and in the same way, the base station other than the base station BS1 may be decided as the relay device for the CoMP transmission/reception together with the base station BS1 based on the GPS information of the wireless terminal MS, which is included in the feedback information from the wireless terminal MS.

Moreover, in the above, the description has been made on the assumption that the base stations BS1 and BS2 function as base stations in usual, and function as relay devices in the CoMP transmission/reception; however, communication devices dedicated for the relay, such as repeaters may be used in place of the base stations BS1 and BS2.

That is to say, the repeaters are communication devices dedicated for the relay, which are to be used for executing communication, for example, with a wireless terminal located at a position, at which it is difficult to receive a radio signal from any base station, in the communication between the base stations and the wireless terminal. The repeaters have a function to amplify signals, which are received from the base stations, and to output the amplified signals to the wireless terminal.

Among the repeaters, there are also ones, each having a function as described as Step S1 (FIG. 4), which is to acquire received information of the uplink signal from the wireless terminal MS, the received information including the RSSI of the uplink signal and the CINR of the uplink signal, and a function as described as Step S2 (FIG. 4), which is to acquire the feedback information from the wireless terminal MS. In addition to these functions, such repeaters are provided with a function as described as Step S3 (FIG. 4), which is to determine whether or not it is necessary to implement the CoMP processing, whereby the repeaters can be used in place of the base stations BS1 and BS2. This system is effective in a region where a communication area cannot be ensured without using the repeaters.

Moreover, in the above, the description has been made of the configuration, in which any of the base stations is defined as the host-side base station BSX, and the host-side base station BSX uses the plurality of other base stations as the relay devices of the wireless entrance lines; however, the line exchange EX may be used in place of the host-side base station BSX. The line exchange EX is provided with a wireless communication function for opening the wireless entrance lines and a CoMP transmission/reception control function for controlling the CoMP transmission/reception, whereby it becomes possible to control the CoMP transmission/reception.

<Modification Example>

In the wireless communication system 100 described above, the description has been made of the configuration, in which any of the base stations is defined as the host-side base station BSX, and the host-side base station BSX uses the plurality of other base stations as the relay devices of the wireless entrance lines; such a configuration may also be adopted, in which, in place of the host-side base station BSX, the base station under connection to the wireless terminal MS performs the wireless communication with the other base station through the wireless entrance line, and executes the CoMP processing.

<Configuration of Wireless Communication System>

Figure 8:
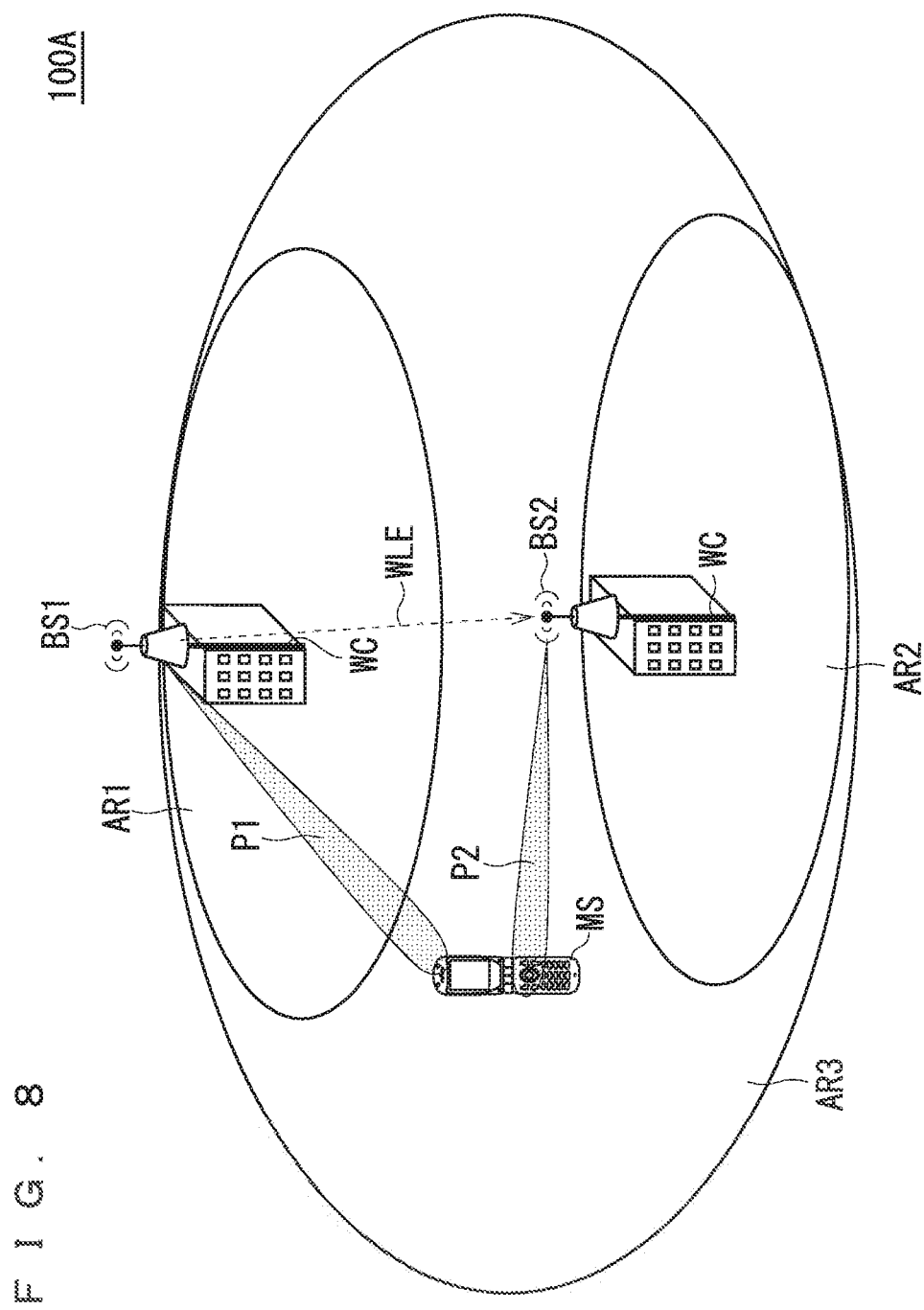
FIG. 8 is a view showing a configuration of a communication system of a modification example of the embodiment according to the present invention.

A wireless communication system 100A shown in FIG. 8 includes the wireless terminal MS and the base stations BS1 and BS2. The base stations BS1 and BS2 are connected to each other through the wired line WC such as an optical line and an ISDN line, and a host device (not shown) is also connected to the wired line WC.

A configuration of each of the base stations BS1 and BS2 is basically the same as the configuration described by using FIG. 2; however, in order to control the CoMP transmission/reception in a similar way to the host-side base station BSX (FIG. 3), such CoMP transmission/reception control unit is provided in the radio signal processing units 2 and each of the MAC units 3 each.

<Flow Until Execution of CoMP Transmission/Reception>

While referring to FIG. 8, a description is made below of a flow until execution of the CoMP transmission/reception in the wireless communication system 100A according to the present invention by using a flowchart shown in FIG. 9.

In the following description, it is premised that the wireless terminal MS and the base station BS1 are in a state under communication connection in the wireless communication system 100A shown in FIG. 8.

Figure 9:
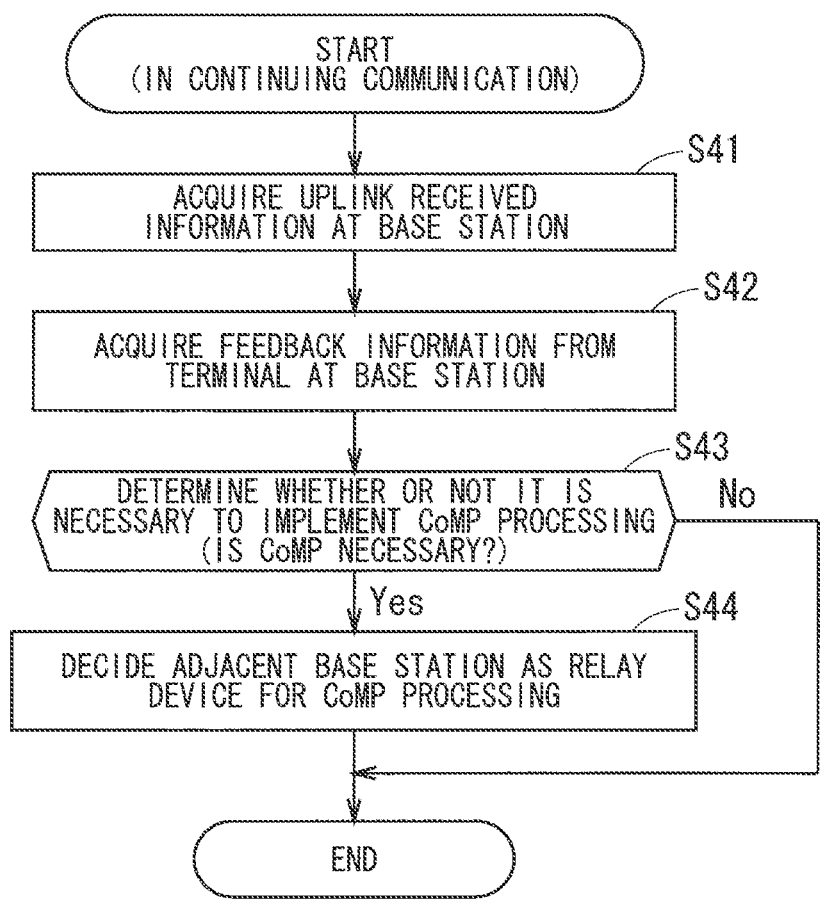
FIG. 9 is a flowchart explaining a modification example of the communication control method of the communication system of the embodiment according to the present invention.

FIG. 9 is a flowchart explaining a communication control method of the wireless communication system 100A according to the present invention.

In FIG. 9, the base station BS1 in the state under the communication connection with the wireless terminal MS acquires the reception information of the uplink signal from the wireless terminal MS (Step S41). This reception information includes the signal quality information such as the RSSI of the uplink signal and the CINR of the uplink signal.

Moreover, the base station BS1 acquires feedback information from the wireless terminal MS (Step S42). This feedback information includes the signal quality information (RSSI, CINR) of the downlink signal from the base station BS1, which has been received by the wireless terminal MS, the error rate in the wireless terminal MS, the handover candidate information, and the GPS information of the wireless terminal MS.

The base station BS1, which has acquired the information described above, performs the determination as to whether or not it is necessary to implement the CoMP processing, that is, the determination as to whether or not the CoMP processing is necessary based on the acquired information, for example, in the MAC unit 3 (Step S43). Note that a determination operation in Step S43 is similar to the determination processing in Step S3 (FIG. 4) described by using FIG. 5 to FIG. 7.

In a case where it is determined that the CoMP processing is necessary in Step S43, the adjacent base station BS2 is decided as the relay device for the CoMP transmission/reception (Step S44), and a series of the processing is ended.

Such a configuration is adopted, whereby it becomes unnecessary to set the host-side base station, and accordingly, a more simple system can be constructed.

Here, the base station BS1 may decide the base station, which is other than the base station BS1 itself, as the relay device for the CoMP transmission/reception, for example, based on the handover candidate information included in the feedback information from the wireless terminal MS, which is acquired in Step S41, and in the same way, may decide the base station, which is other than the base station BS1 itself, as the relay device for the CoMP transmission/reception based on the GPS information of the wireless terminal MS, which is included in the feedback information from the wireless terminal MS.

Note that, in the wireless communication system 100A, after deciding the base station BS2 as the relay device, the base station BS1 opens the wireless entrance line WLE with the base station BS2, and gives the signal, which is to be transmitted to the wireless terminal MS, also to the base station BS2.

As described above, the wireless communication with one wireless terminal is performed through the relay device as well as the base station itself, whereby it becomes possible to perform the CoMP transmission/reception.

Note that a series of the processing is ended also in a case where it is determined that the CoMP processing is unnecessary in Step S43; however, the processing of Steps S41 to S43 is repeatedly executed in a case where the base station is under connection to any of the wireless terminals.

The invention claimed is:

1. A wireless communication system comprising:
   a wireless terminal;
   a plurality of communication devices which perform wireless communication with said wireless terminal; and
   a host-side communication device capable of performing wireless communication with said plurality of communication devices,
   wherein each of said plurality of communication devices includes a control unit that, in a case where said communication device is under connection to said wireless terminal, acquires received information of an uplink signal from said wireless terminal and feedback information from said wireless terminal, and performs a determination as to whether or not coordinated multipoint transmission/reception processing by the wireless communication with said host-side communication device is necessary based on either of said acquired received information of said uplink signal and said feedback information,
   in a case of having determined that said coordinated multipoint transmission/reception processing is necessary, said control unit requests said coordinated multipoint transmission/reception processing to said host-side communication device, and in addition, transmits information to said host-side communication device, the information being necessary to decide other communication device cooperating with each of said plurality of communication devices for said coordinated multipoint transmission/reception processing,
   said host-side communication device includes a control unit that, in a case where said coordinated multipoint transmission/reception processing is requested, decides, based on said information, said other communication device cooperating with each of said plurality of communication devices for said coordinated multipoint transmission/reception processing, opens wireless lines for the communication device under connection to said wireless terminal and for said other communication device, and sends a same signal to said other communication device and the communication device under connection to said wireless terminal, thereby performs said coordinated multipoint transmission/reception processing, and
   said control unit of each of said plurality of communication devices controls a station including said control unit to function as a relay device in a case of transferring a signal with said host-side communication device through said wireless line.

2. The wireless communication system according to claim 1,
   wherein said received information of said uplink signal includes a received signal strength indication of said uplink signal and a carrier to interference-plus-noise ratio of said uplink signal, and
   said control unit of each of said communication devices determines that said coordinated multipoint transmission/reception processing is necessary in a case where a value of at least either one of said received signal strength indication of said uplink signal and said carrier to interference-plus-noise ratio of said uplink signal is smaller than a predetermined threshold value.

3. The wireless communication system according to claim 1,
   wherein said feedback information includes handover candidate information serving as a candidate for handover, the candidate being decided by said wireless terminal based on a value of either one of a received signal strength indication of a downlink signal from each of said plurality of communication devices, the downlink signal having received by said wireless terminal, and of a carrier to interference-plus-noise ratio of the downlink signal, and
   said control unit of each of said plurality of communication devices determines that said coordinated multipoint transmission/reception processing is necessary in a case where, with regard to the communication device which said wireless terminal defines as said candidate for the handover, a value of said received signal strength indication of said downlink signal or said carrier to interference-plus-noise ratio of said downlink signal is larger than a value of said received signal strength indication of said downlink signal between the communication device itself and said wireless terminal or of said carrier to interference-plus-noise ratio of said downlink signal.

4. The wireless communication system according to claim 1,
   wherein said feedback information includes handover candidate information serving as a candidate for handover, the candidate being decided by said wireless terminal based on a value of either one of a received signal strength indication of a downlink signal from each of said plurality of communication devices, the downlink signal having received by said wireless terminal, and of a carrier to interference-plus-noise ratio of the downlink signal, and
   said control unit of each of said plurality of communication devices determines that said coordinated multipoint transmission/reception processing is necessary in a case where, with regard to the communication device which said wireless terminal defines as said candidate for the handover, a value of said received signal strength indication of said downlink signal or said carrier to interference-plus-noise ratio of said downlink signal is larger than a predetermined value.

5. The wireless communication system according to claim 1,
   wherein said feedback information includes position information of said wireless terminal, and
   said control unit of each of said plurality of communication devices searches a position of a communication device on a periphery of said wireless terminal based on position information of said wireless terminal, and in a case where a communication device closer to said wireless terminal than a station including said control unit, determines that said coordinated multipoint transmission/reception processing is necessary.

6. A wireless communication system comprising:
   a wireless terminal; and
   a plurality of communication devices which perform wireless communication with said wireless terminal,
   wherein each of said plurality of communication devices includes a control unit that, in a case where said communication device is under connection to said wireless terminal, acquires received information of an uplink signal from said wireless terminal and feedback information from said wireless terminal, and performs a determination as to whether or not coordinated multipoint transmission/reception processing by wireless communication with other communication device is necessary based on either of said acquired received information of said uplink signal and said feedback information, in a case of having determined that said coordinated multipoint transmission/reception processing is necessary, said control unit decides said other communication device cooperating with each of said plurality of communication devices for said coordinated multipoint transmission/reception processing, and in a case where a station including said control unit is said communication device under connection to said wireless terminal, opens a wireless line for said other communication device, sends a same signal to said other communication device, thereby performs said coordinated multipoint transmission/reception processing, and in a case where the station including said control unit is said other communication device, said control unit of each of said plurality of communication devices controls the station to function as a relay device in a case of transferring a signal through said wireless line with said communication device under connection to said wireless terminal.

7. A communication control method of wireless communication system including:
   a wireless terminal;
   a plurality of communication devices which perform wireless communication with said wireless terminal; and
   a host-side communication device capable of performing wireless communication with said plurality of communication devices,
   said communication control method comprising the steps of:
   (a) in said communication device under connection to said wireless terminal, acquiring received information of an uplink signal from said wireless terminal and feedback information from said wireless terminal;
   (b) performing a determination as to whether or not coordinated multipoint transmission/reception processing by the wireless communication with said host-side communication device is necessary based on either of said received information of said uplink signal and said feedback information, said received information and said feedback information being acquired in said step (a);
   (c) in a case of having determined that said coordinated multipoint transmission/reception processing is necessary in said step (b), requesting said coordinated multipoint transmission/reception processing to said host-side communication device, and in addition, transmitting information to said host-side communication device, the information being necessary to decide other communication device cooperating with each of said plurality of communication devices for said coordinated multipoint transmission/reception processing;
   (d) in a case where said coordinated multipoint transmission/reception processing is requested in said host-side communication device, deciding, based on said information, said other communication device cooperating with each of said plurality of communication devices for said coordinated multipoint transmission/reception processing, opening wireless lines for said communication device under connection to said wireless terminal and for said other communication device, and sending a same signal to said other communication device and the communication device under connection to said wireless terminal, thereby performing said coordinated multipoint transmission/reception processing; and
   (e) in each of said plurality of communication device, controlling a station including said control unit to function as a relay device in a case of transferring a signal with said host-side communication device through said wireless line.

* * * * *